United States Patent [19]

Woerman

[11] Patent Number: 4,771,670
[45] Date of Patent: Sep. 20, 1988

[54] BALE LIFTER-CARRIER AND SLICER

[76] Inventor: Marion K. Woerman, Rte. 1, Box 67, Oakland, Nebr. 68045

[21] Appl. No.: 779,841

[22] Filed: Sep. 25, 1985

[51] Int. Cl.$^4$ .................. A01F 29/08; A01F 29/10; B26D 3/12
[52] U.S. Cl. .......................................... 83/861; 83/23; 83/750; 83/759; 83/795; 83/928; 30/379; 30/379.5; 144/1 R
[58] Field of Search ............... 241/101.1, 101 A, 105; 83/928, 795, 750, 861, 753, 758, 759, 13, 23; 19/80 A; 30/379, 379.5; 144/1 R

[56] References Cited

U.S. PATENT DOCUMENTS

| | | | |
|---|---|---|---|
| 870,474 | 11/1907 | Scott | 83/928 X |
| 919,389 | 4/1909 | Shea | 83/928 X |
| 1,289,604 | 12/1918 | Baker | 30/379 |
| 2,284,919 | 6/1942 | Nielson | 83/928 X |
| 2,400,595 | 5/1946 | Okeson | 83/928 X |
| 2,746,492 | 5/1956 | Hardit | 30/379.5 X |
| 3,845,796 | 11/1974 | Moore | 144/1 R |
| 4,018,255 | 4/1977 | Diggs | 83/928 X |
| 4,250,783 | 2/1981 | Ogle | 83/928 X |
| 4,336,732 | 6/1982 | Liet et al. | 83/928 X |

Primary Examiner—Horace M. Culver

[57] ABSTRACT

A method and apparatus for slicing, lifting and carrying round bales or the like. The method for slicing the bale consists of making a radial cut through the length of the bale. The radial cut causes the circumferentially wrapped bale fibers to be cut which causes bale to open up. A partial radial cut, leaving the outer bale fibers uncut, can be made leaving bale substantially in a cylindrical shape to facilitate easy transport with a forklift like carrier. The apparatus consists of a mast assembly mounted to raiseable three point hitch of an agricultural tractor or the like. A pair of parallel forks are directly attached to mast and engage the curved sides of bale so as to lift and support bale for easy transport. A hydraulically activated knife assembly is attached to mast and forks. The knife has serrated teeth which cut through bale when knife reciprocates. A bumper or work guide when attached to the end of forks holds bale during cutting process.

5 Claims, 5 Drawing Sheets

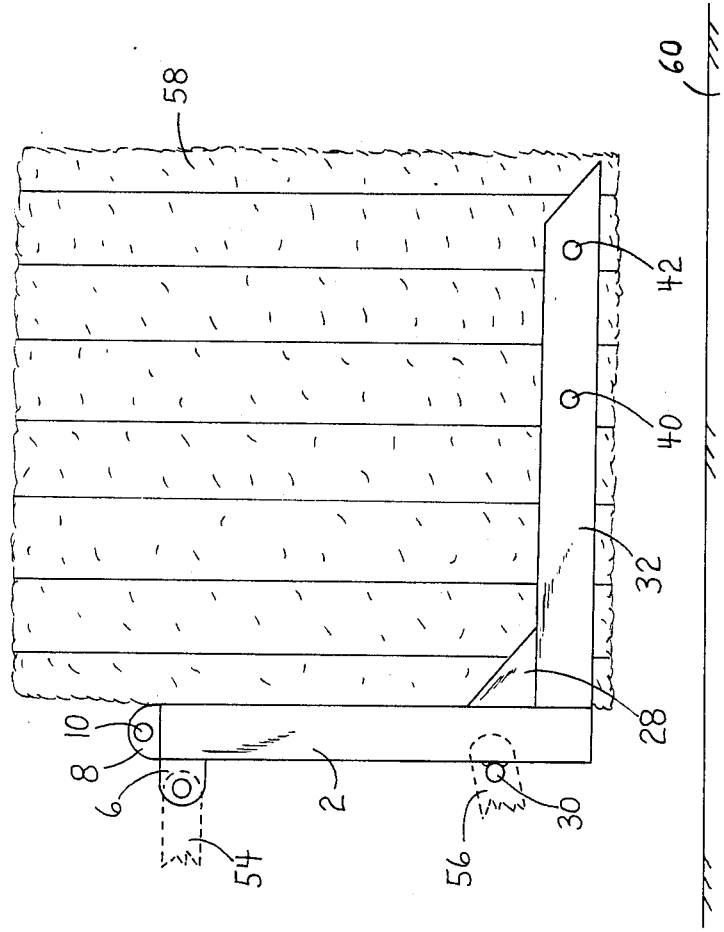

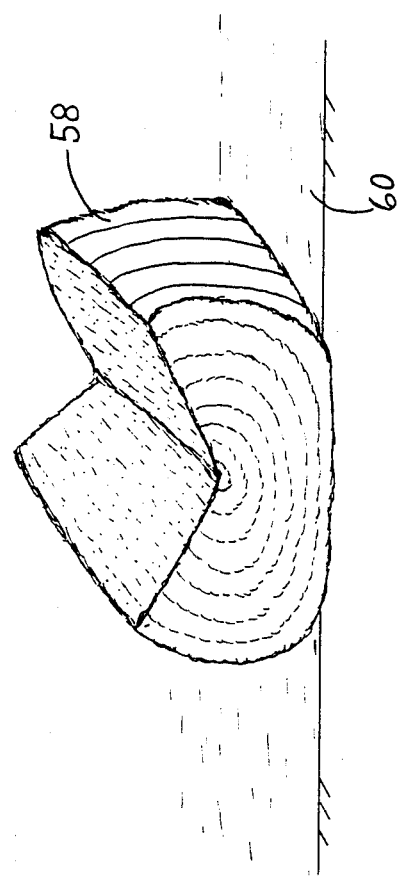

BALE LIFTER-CARRIER AND SLICER

BACKGROUND OF THE INVENTION

1. Field of the Invention

This invention is a novel type of cutter attachment for the three point hitch on an agricultural tractor particularly designed to cut through the length of a bale allowing the bale to be divided into smaller pieces which are easier to feed and ration to livestock. The device can be easily converted to a forklift which can be used to lift and transport said bales.

2. Description of the Prior Act

In recent years, it has become commonplace to bind bales of hay in a cylindrical shape with automated hay baling equipment. These cylindrical hay bales are difficult to feed in small portions to livestock because the bale is wrapped very tightly by the hay baling equipment. The bales are large and can weigh 1500 pounds or more. The bales are difficult to handle and transport.

Techniques for processing the bales include grinding the hay bale in a large tub like machine and conveying the ground hay to the feeding site. This requires a relatively expensive machine and is usually unsuitable for a small operator. Bales are also placed whole in special feeders allowing the animals to pull out and eat small portions. Bales are often transported with a forklift device fitted to a three point hitch on an agricultural tractor. Other larger devices are available for carrying several bales at once. The forklift device in itself which is integrated into the invention claimed in this patent, is not new and unique. However, this integration with the cutting means and the unique method for cutting the bales for which cutting means was designed makes it patently unique.

SUMMARY OF THE INVENTION

This invention incorporates several simple, but novel ideas into a forklift and cutter attachment for the three point hitch on an agricultural tractor or similar vehicle. The device has been designed, constructed and tested for successfully slicing through large cylindrical hay bales and can also be used to load, transport and unload a bale in two different ways.

The device is comprised of a frame with attachment points for mounting the device on an agricultural tractor's three point hitch. Two parallel cantilever forks extend out behind the frame at lower part of the frame. A bumper connects the pointed rearward ends of the parallel forks. The bumper is used to hold the bale for slicing by a larger hydraulic cylinder activated knife which penetrates through the length of a bale beginning at top curved surface of bale. The knife is positioned axially with respect to the length of the bale as a work guide or bumper contacts end of bale. The reciprocating action of the knife while the weight of knife and framework is pushing down on bale causes knife to cut through the bale as operator places three point hitch in lowering mode and activates hydraulic cylinder. The knife is retained in a horizontal position by four parallel links which attach along knife and reciprocate with knife. A sheath, not shown in figure, can be placed over knife to protect knife and shield it for greater operator safety when it is not being used. If transport of a bale is desired, the knife, hydraulic cylinder, parallel links and bumper can be easily removed by pulling five pins leaving a forklift type device. Transport of bale can also be accomplished by leaving knife, hydraulic cylinder, parallel links and bumper intact whereby knife can penetrate through center of bale at which time three point hitch can be raised causing knife to raise and bale to raise as bale rests on knife.

BRIEF DESCRIPTION OF THE DRAWINGS

FIG. 4 is a side view of my invention lifting a bale. (Bale slicing mechanism is removed).

FIG. 5 is an orthogonal view of a bale which has been cut by my invention.

DESCRIPTION OF THE PREFERRED EMBODIMENT

Figure 1:
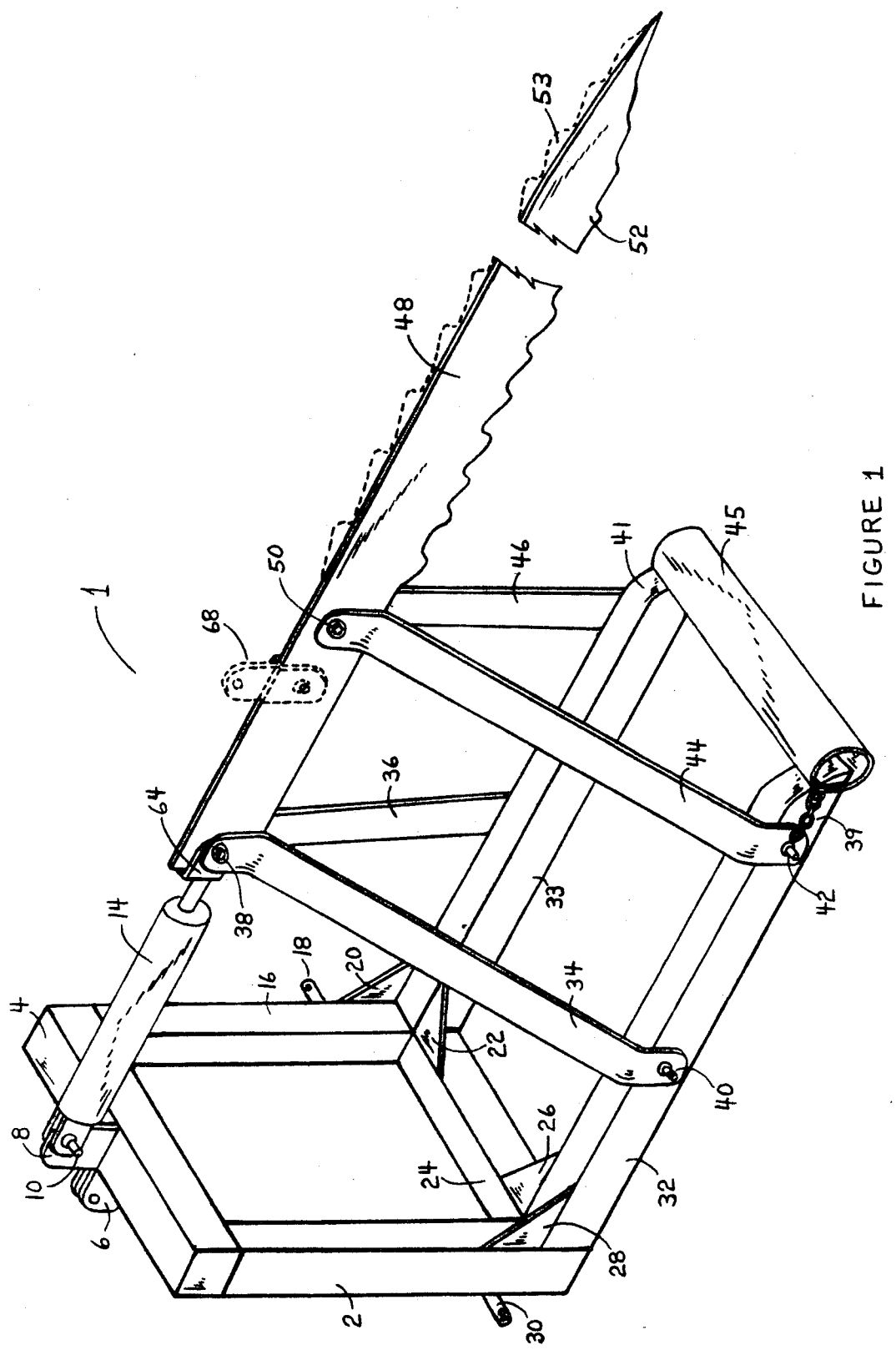
FIG. 1 is an orthogonal view of my invention.

Referring to the drawings in detail, specifically FIGS. 1 through 5, reference character 1 generally, indicates a bale slicing apparatus, henceforth referred to as apparatus, having a mast assembly comprised of a pair of vertical members, 2 and 16, and horizontal members 4 and 24. Pins 30 and 18 and clevis 6 are fixed to mast assembly to facilitate attachment of apparatus to an agricultural tractor's three point hitch lift links 54 and 56. Parallel forks 32 and 33 are fixed to mast assembly in a spaced substantially parallel position, and are pointed at their rear most ends. A bumper 45 which has two holes which fit onto the points of parallel forks is fastened to forks by chains, 39 and 41, at pins 42. Gussets 22, 26, 20 and 28 strengthen the apparatus at the highly stressed areas. Pins 40 and 42 are fixed to left fork 32. Another set of identical pins are fixed to right fork 33 in the same way. Links 34 and 44 are attached to pins 40 and 42 on left side. Links 36 and 46 are attached to pins in the same manner on the right side. The links 44 and 46 converge in a triangular geometry at the top, and are pinned 50, together along with knife 48. Links 34 and 36 are pinned 38, to knife 48 at their top end in a similar manner. A hydraulic cylinder 14 is pinned 10 to mast at clevis 8 and to knife at clevis 64. Hydraulic cylinder can be pinned to a separate clevis 68 above knife. This enables a longer hydraulic cylinder with a longer stroke to be installed. Teeth 52 are located on rear portion of knife 48 to facilitate cutting through the bale. The knife can be installed with the teeth pointing upward and/or downward as desired, 52 or 53. Extension and retraction of hydraulic cylinder causes knife 48 and links 44, 46, 36 and 34 to reciprocate.

The knife 48, links 44, 46, 36, 34, bumper 45 and hydraulic cylinder 14 can be removed from apparatus leaving a forklift carrier which can be used to load, transport and unload a bale as indicated in FIG. 4.

Figure 2:
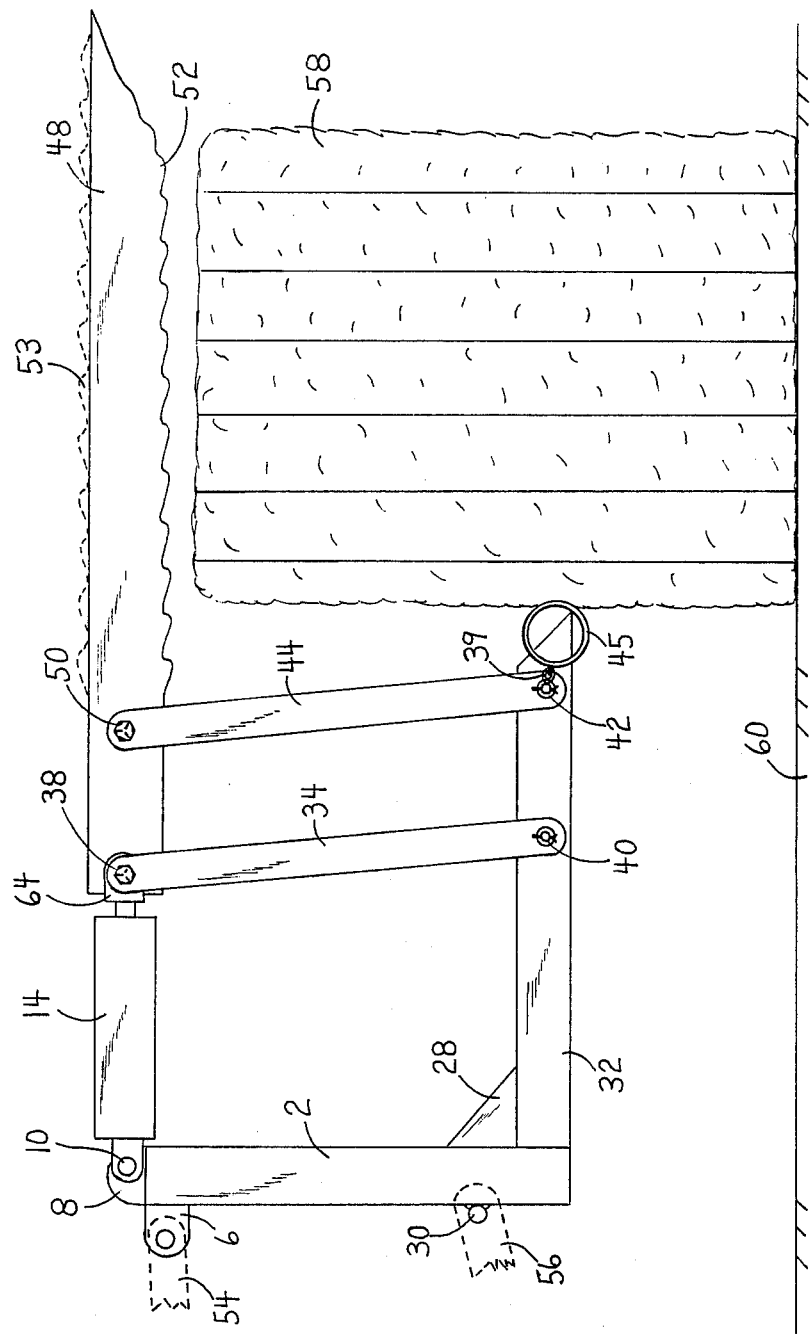
FIG. 2 is a side view of my invention attached to a tractor in position to slice a bale.
Figure 3:
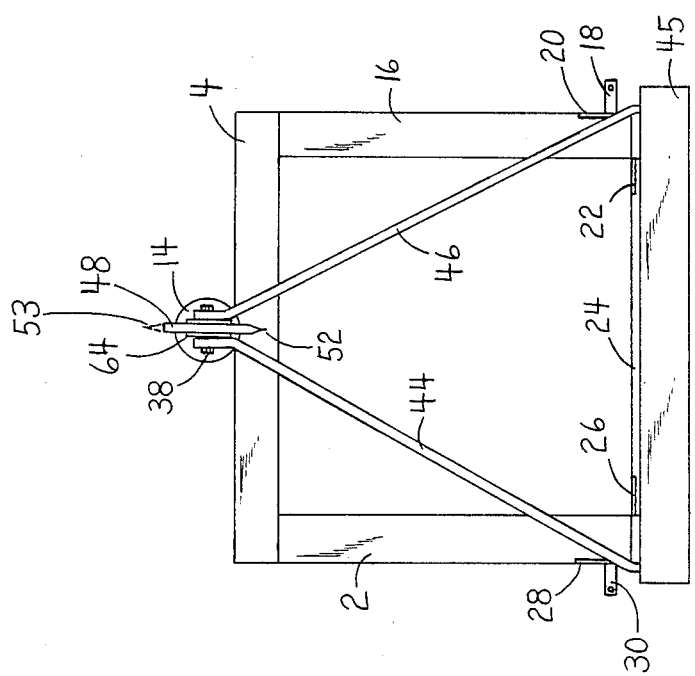
FIG. 3 is a rear view of my invention.

Referring now to FIG. 2 in operation, the apparatus may be connected to a farm tractor or any other suitable vehicle. The lift links on the vehicle are raised by vehicle operator which raises the apparatus above the ground to a position high enough so that knife can pass over the top of the bale. The vehicle is then driven to a location where knife, teeth pointing downward, is directly above bale for the full length of bale and bumper contacts end of bale as indicated in FIG. 2. The vehicle operator then lowers the lift links which lowers the apparatus so that the knife rests on top of the bale. The hydraulic cylinder is then activated which causes knife to reciprocate and the teeth of knife to cut through the bale. The knife is retained in a horizontal position by four parallel links which attach along knife and reciprocate with knife. The knife will continue to cut down through bale until the parallel forks 32 and 33, and/or the bumper 45 contact the ground at which time the operator can raise the lift links which raises the apparatus so that knife is above the bale at which time vehicle is driven away from the bale. The bale is now cut to its center which facilitates easy removal of the concentric layers of hay for rationing to livestock as indicated in FIG. 5.

The knife 48 can be installed with the teeth pointing upward. See FIG. 1, Item 53. In this position, the operator aligns the knife with the center axis of bale. He then drives tractor so knife penetrates through center of bale until bumper 45 contacts bale. The three point hitch can then be raised slightly which raises the apparatus so that all or partial weight of bale rests on knife. The hydraulic cylinder is then activated which causes knife to reciprocate and teeth 53 on knife to cut upward through the bale as weight of bale rests on knife and bumper contacts end of bale keeping bale from reciprocating with knife. After bale is cut operator can lower lift links which lowers the apparatus at which time vehicle can be driven away from bale. Bale can be cut completely through all of its concentric layers or a thin outside layer can be left uncut. The thin uncut outside layer of bale and the uncut bale twine string keeps the bale together and protects the bale from the weather. This thin layer and twine string can be cut when desired causing bale to fall apart as in FIG. 5.

The bale slicing mechanism can be used to load, transport and unload a bale. See Photographs 5. If this is desired, operator then penetrates knife through center of bale along its cylindrical axis and then raises lift links which raises apparatus and knife which raises bale which rests on knife. The bale can then be transported to a desired location at which time operator lowers lift links which lowers apparatus, knife and bale causing bale to contact ground surface at which time operator can then drive vehicle away from bale or cut bale whichever is desired.

The bale slicing mechanism i.e. the hydraulic cylinder, parallel links, knife and bumper can be removed from the carrier which converts the apparatus into a forklift type device as indicated in FIG. 4. This forklift type device can be used to load, transport and unload a bale or any other suitable objects which allow the parallel forks to pass underneath them. The forks are pointed on their rearward ends to guide the forks underneath a bale or other suitable objects.

The two functions of the apparatus, that is slicing bales and object transporting, makes the cost of apparatus less than the cost of two separate devices to accomplish those functions.

It should be noted that modifications of this apparatus apart from those mentioned can be made within the spirit and scope of the invention.

I claim:

1. A method for preparing a cylindrical bale or the like for feeding to livestock using a longitudinal cutter having a cutting edge and a bumper or work guide, and adapted to be attached to a forklift on an agriculture tractor, comprising the following steps:
   attaching the cutter to the forklift,
   moving the cutter longitudinally in a direction parallel to a central longitudinal axis of the bale until the work guide abuts an end surface of the bale,
   moving the cutter along or near a radius of the bale while maintaining the workguide in contact with the end surface of the bale thereby cutting the bale from a point at or near the central longitudinal axis to an outer surface of the bale,
   removing the cutter from the forklift of the tractor, and
   lifting the bale with the forklift, transporting the bale to a feed site and depositing the bale at the feed site.

2. A method according to claim 1 wherein the cutting edge of the cutter faces downward and the step of moving the cutter radially comprises moving the cutter downward along or near a radius of the bale until the workguide contacts the ground.

3. A method according to claim 1 wherein the cutting edge of the cutter faces upward and the step of moving the cutter longitudinally comprises penetrating the bale along or near its longitudinal axis, and the step of moving the cutter radially comprises moving the cutter upward along or near a radius of the bale past an outer surface of the bale.

4. A device for slicing, lifting and carrying bales or the like, comprising a main frame, a means to connect said main frame to a tractor, said main frame comprising a substantially vertical mast assembly, two substantially horizontal and parallel spaced cantilever beams, a work guide connecting rearward ends of said cantilever beams, a slicing assembly operably correlated with said mast assembly and said cantilever beams, said slicing assembly comprised of a substantially horizontal knife with upward and/or downward projecting teeth, said knife extending beyond rearward end of said work guide, said knife being raiseable or lowerable, a humanly controllable hydraulic cylinder operably correlated with said knife and said mast assembly for causing said knife to move fore and aft in a sawing motion.

5. A device according to claim 4 wherein said slicing assembly and said work guide are removable allowing said main frame and said cantilever beams to be used as a forklift.

* * * * *